May 2, 1967
L. N. GOODMAN
3,316,983
EARTH AUGER
Filed Oct. 9, 1964
6 Sheets-Sheet 1
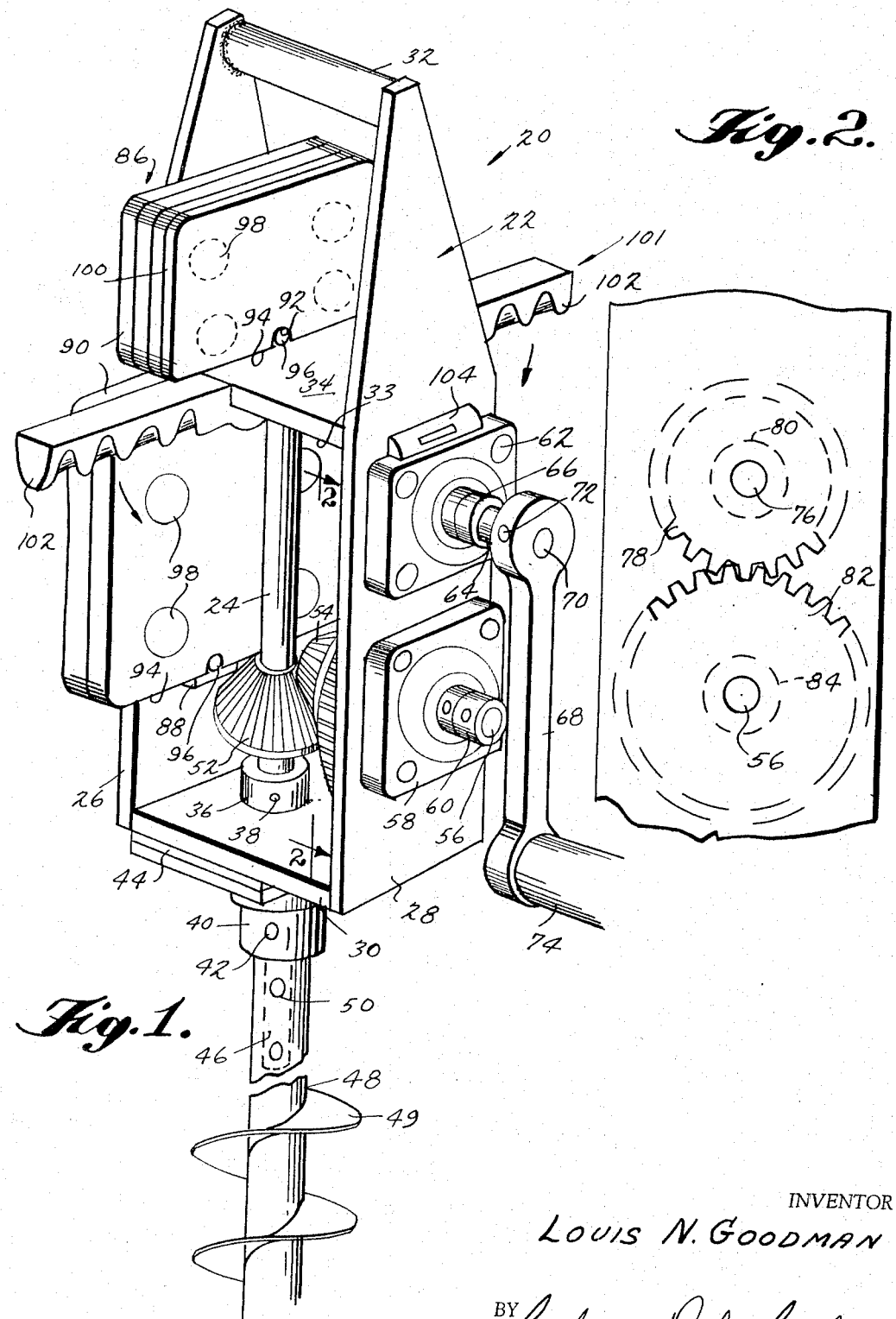
INVENTOR
LOUIS N. GOODMAN
BY Cushman, Darby & Cushman
ATTORNEYS May 2, 1967
L. N. GOODMAN
3,316,983
EARTH AUGER
Filed Oct. 9, 1964
6 Sheets-Sheet 2
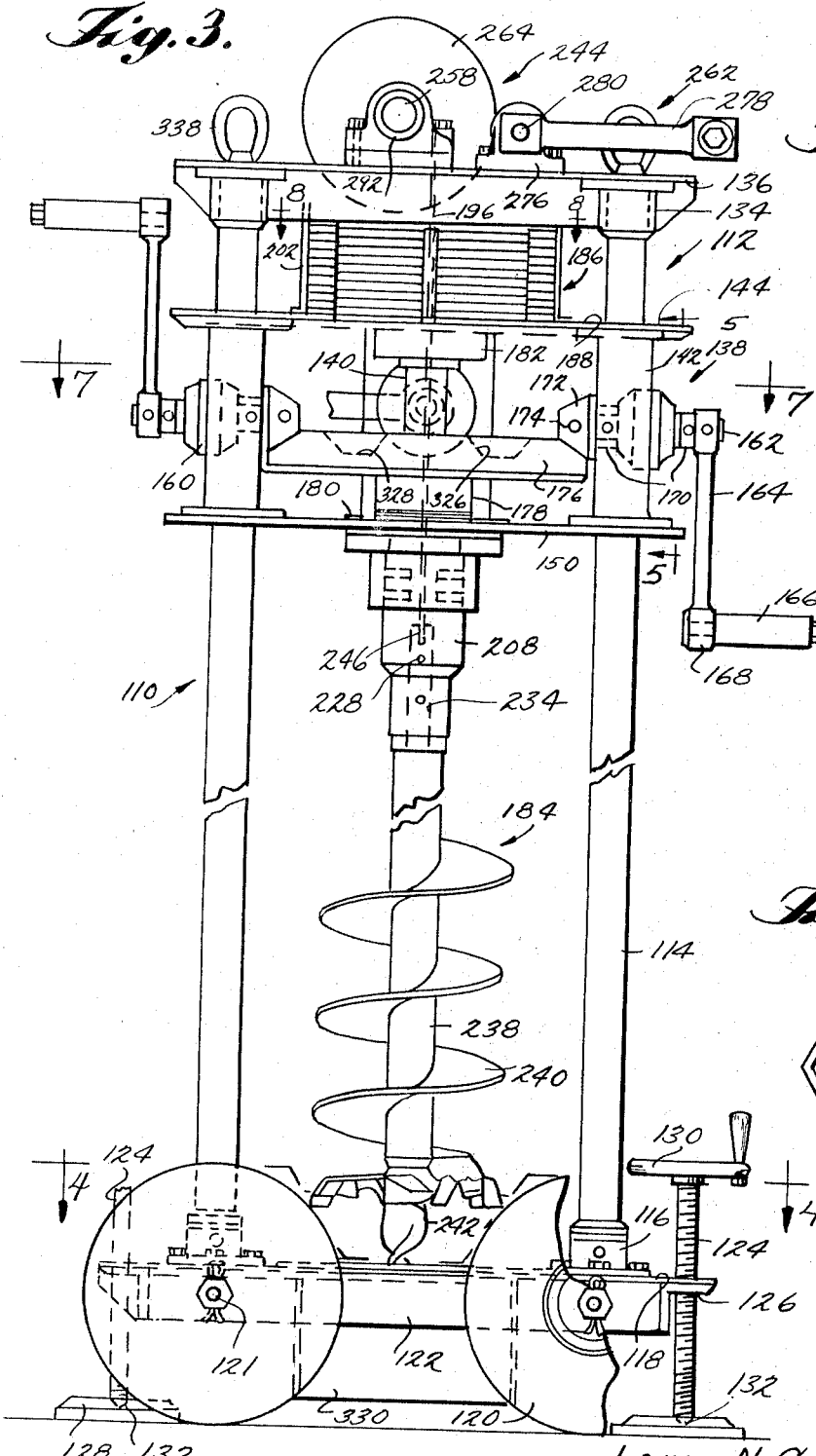
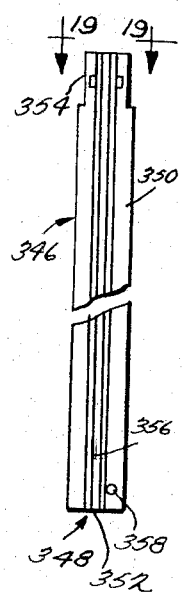
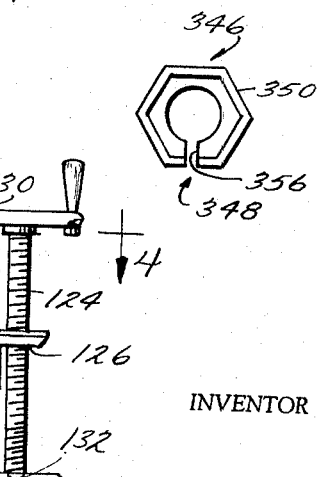
INVENTOR
LOUIS N. GOODMAN
BY Cushman, Darby & Cushman
ATTORNEYS May 2, 1967 L. N. GOODMAN 3,316,983
EARTH AUGER
Filed Oct. 9, 1964 6 Sheets-Sheet 3
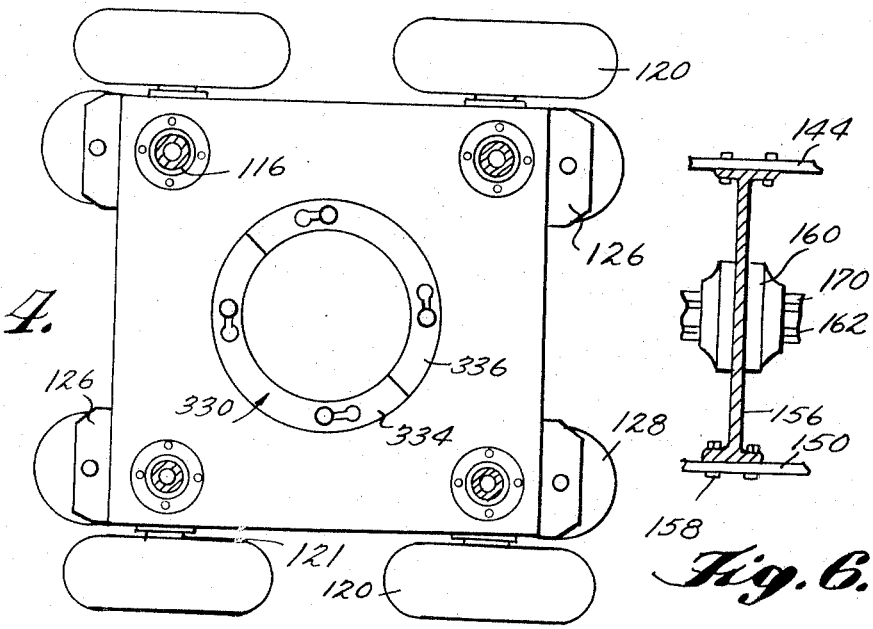
Fig. 4.
Fig. 6.
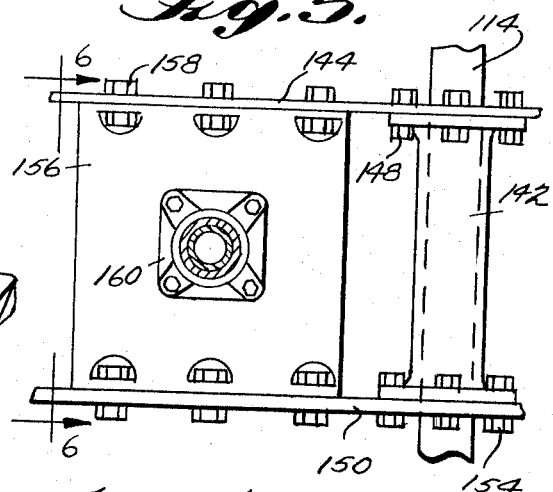
Fig. 5.
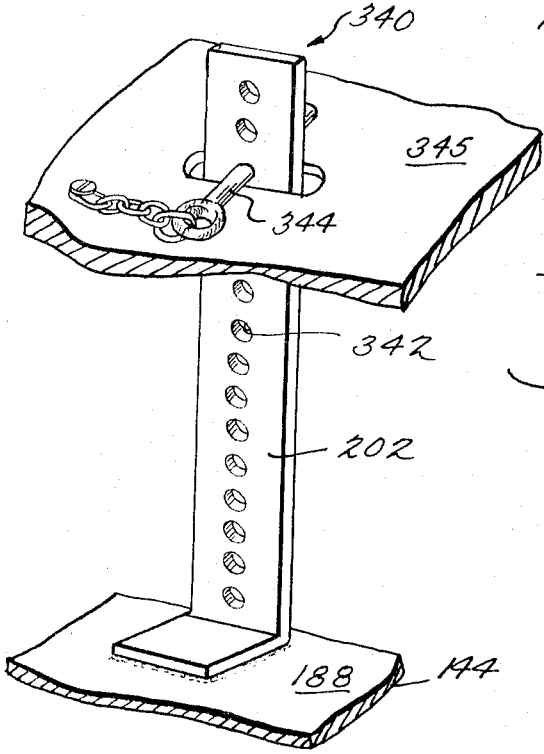
Fig. 17.
Fig. 10.
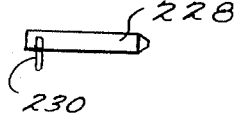
INVENTOR
LOUIS N. GOODMAN
BY Cushman, Darby & Cushman
ATTORNEYS

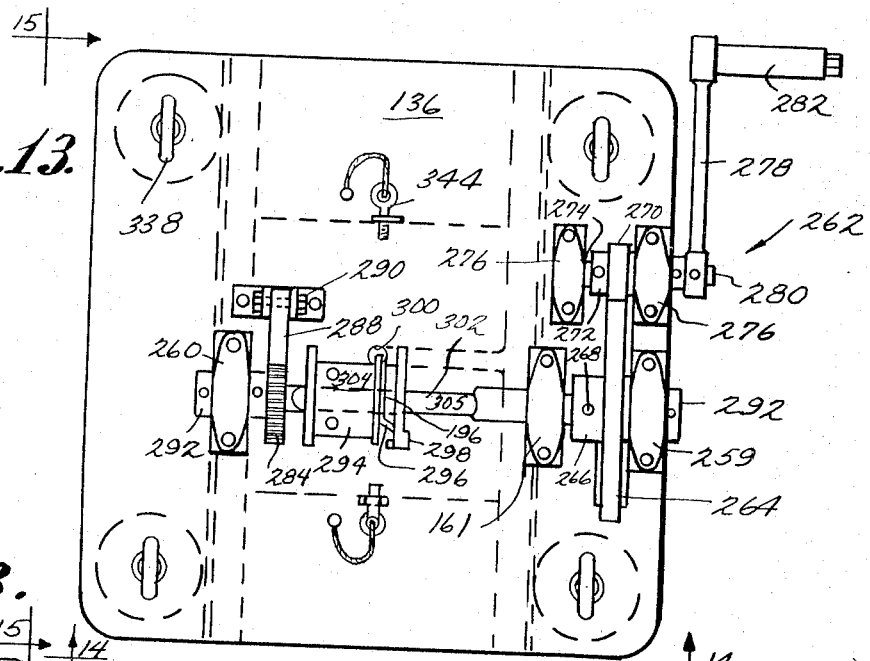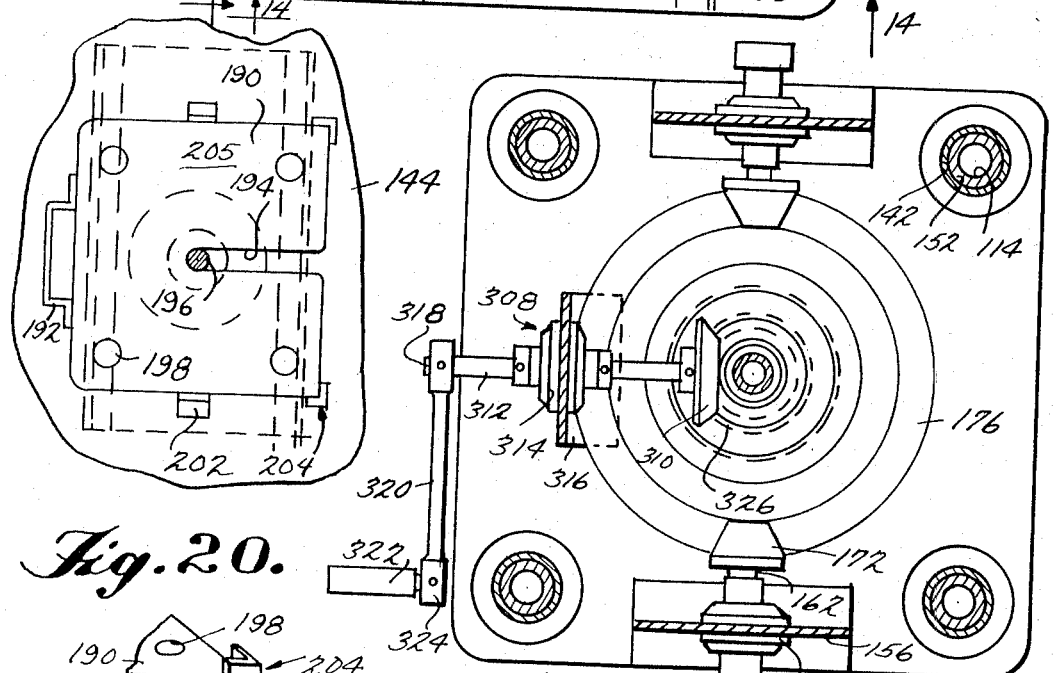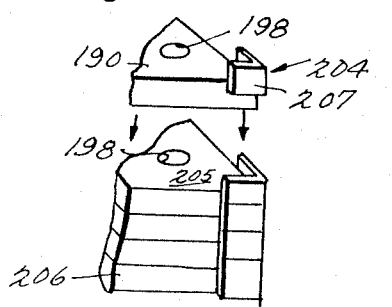

May 2, 1967  L. N. GOODMAN  3,316,983
EARTH AUGER
Filed Oct. 9, 1964

INVENTOR
LOUIS N. GOODMAN
BY Cushman, Darby & Cushman
ATTORNEYS

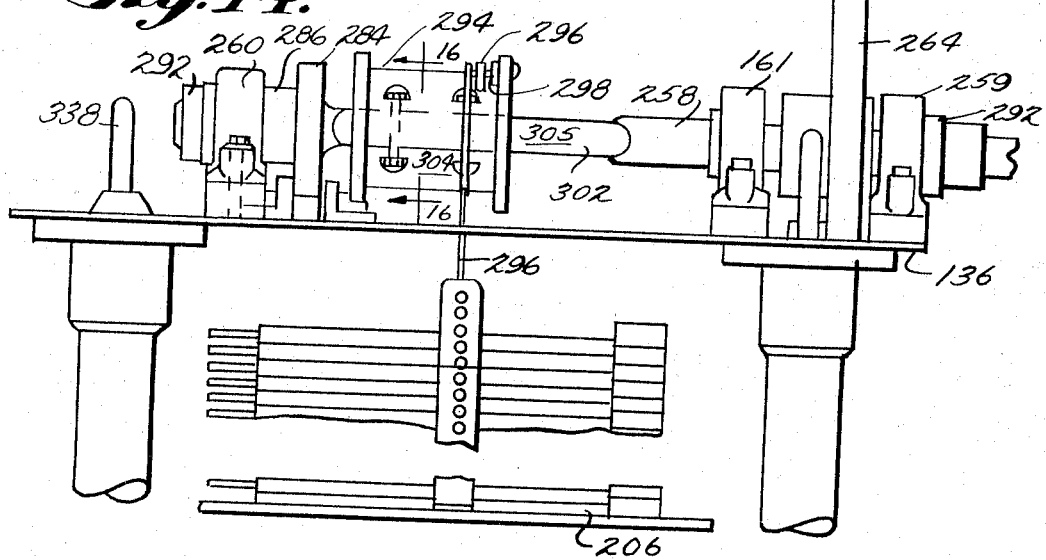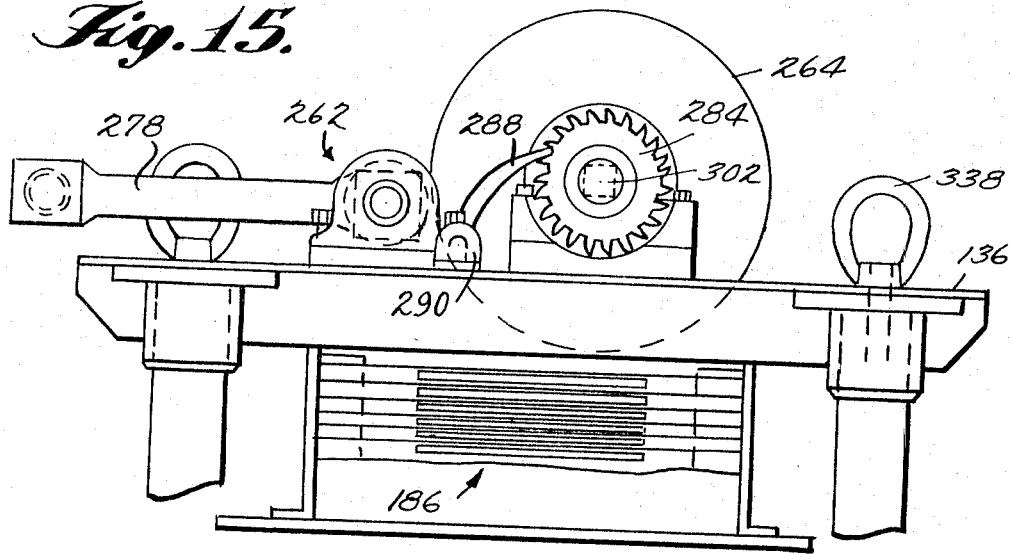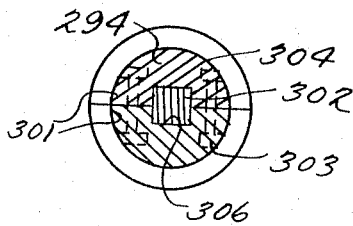

United States Patent Office 3,316,983
Patented May 2, 1967

3,316,983
EARTH AUGER
Louis N. Goodman, 5510 S. Claiborne Ave.,
New Orleans, La. 70125
Filed Oct. 9, 1964, Ser. No. 402,886
23 Claims. (Cl. 173—163)

This invention relates to earth augers and more particularly to both a small hand-held auger and a large free-standing auger embodying the novel improvements hereinafter set forth.

For such jobs as erecting electric line poles, installing fence posts, and digging foundations for masts, flag poles, etc., it is most desirable to move a truck-mounted, heavy-duty power-driven auger up to the place where the hole is to be dug and accomplish the job rapidly. But the expense of owning, or even renting, such an auger is prohibitive for those with small and infrequent digging jobs. Furthermore, even with sufficient business to justify owning such an auger, there are many places which are inaccessible to trucks. The only other alternative is to use a conventional hand-manipulated two-handle bucket type of post hole digger. However, this method is often slow, and the depth to which a hole can be conveniently dug is limited. The hand-manipulated digger is often used by nurserymen and gardeners, but it still lacks the convenience of a relatively fast and easy way to bore a large number of holes.

Previous efforts to provide a satisfactory solution to these problems have been ineffective primarily due to the fact that these earth augers did not provide a sufficient bite when boring.

Therefore, it is an object of this invention to provide an earth auger having means to increase its bite or grabbing power. Moreover, it is an object of this invention to make such means removable so as to be able to vary the bite depending on the consistency of the soil. This object is accomplished by providing removable weights which are added to the earth auger in such a manner that they are operatively connected with the auger means.

While adding weights to increase the bite of the auger is one of the primary objects of this invention, it is also an object of the invention to add the weights so that the center of gravity of that part of the earth auger which is operatively associated with the bite of the auger is aligned as closely as possible with the axis of the drive shaft and auger. This feature enables the small hand-supported earth auger to be balanced easily. With the large earth auger, the center of gravity of the driving head is aligned as closely as possible with the axis of the drive shaft and auger means so that the driving head will slide without binding on its support elements.

Another object of the invention is to provide earth augers with leveling means for positioning the auger vertically. Not only does such means enable the hole to be vertical, but it also enables the auger to be removed more easily from the hole, particularly with the small auger.

It is still a further object of this invention to provide other means for facilitating the removal of the earth auger from the ground. For instance, with the small auger such means could comprise handles which are pivoted from an unused position adjacent to the drive shaft to a lifting position approximately perpendicular to the drive shaft, while with the large earth auger this means could include a winch means for hoisting the auger from the ground.

With the large earth auger, the operation of the removal means is also facilitated by the fact that the removing cable, secured to a winch, is maintained substantially coaxially with the drive shaft and, hence, is in effect an axial extension of the auger means. Accordingly, any force applied by the cable is applied in an axial direction for maximum efficiency. This object is accomplished by providing a rotatable drum on which the cable winds and unwinds and which is keyed to the winch shaft such that it is axially slidable as well as rotatable. Thus the drum, during its rotation, can move axially so as to be positioned over the drive shaft, and the cable will continue to be coaxial with the drive shaft.

Furthermore, it is an object of this invention to provide means for preventing the cable from twisting during the rotation of the auger means.

Still another object of the invention is to provide means to remove dirt from the auger after the auger is withdrawn from the hole.

It is also an object of the invention to provide an extension shaft for the drive shaft and auger means for enabling deep holes to be bored. The extension shaft, moreover, is designed to be attached without removing the cable from the drum or from the auger means.

Still a further object of the invention is to provide means by which the large earth auger can be hoisted on and off a truck and means by which it can be moved over the ground.

The smaller earth auger may be used to bore a hole next to an existing fence or some other structure. Conventional types of hole diggers do not enable a hole of relatively small diameter, such as four inches, to be placed adjacent to an existing structure. The use of a two-handle bucket type digger is often dangerous and awkward for fear that the digger's hand will get caught. Therefore, it is another object of this invention to construct an earth auger so that it can be placed adjacent to an existing structure and still bore a hole of relatively small diameter.

These and other objects of this invention are more clearly depicted in the following detailed description having specific reference to the attached drawings in which the embodiments of the invention are shown, not to limit the scope of the invention in any respect, but so that the principles thereof might be more clearly illustrated.

FIGURE 1 is a perspective view of a small earth auger embodying the principles of the invention;

FIGURE 2 is a sectional view taken substantially along the line 2—2 of FIGURE 1;

FIGURE 3 is a side elevational view of a large earth auger embodying the principles of the invention;

FIGURE 4 is a sectional view taken substantially along the lines 4—4 of FIGURE 3;

FIGURE 5 is a fragmentary side elevational view of the gear drive shaft support members as taken substantially along the lines 5—5 of FIGURE 3;

FIGURE 6 is a sectional view taken substantially along the lines 6—6 of FIGURE 5;

FIGURE 7 is a sectional view taken substantially along the lines 7—7 of FIGURE 3;

FIGURE 8 is a fragmentary plan view taken substantially along the lines 8—8 of FIGURE 3;

FIGURE 10 is a side elevational view of the pin used to connect the coupling pin to the driving hub;

FIGURE 13 is a plan view of the top deck of the earth auger disclosed in FIGURE 3;

FIGURE 14 is a sectional view taken substantially along the lines 14—14 of FIGURE 13;

FIGURE 15 is a sectional view taken substantially along the lines 15—15 of FIGURE 13;

FIGURE 16 is a sectional view taken substantially along the lines 16—16 of FIGURE 14;

FIGURE 17 is a perspective view of a locking element;

FIGURE 18 is a side elevational view of an extension member;

FIGURE 19 is a sectional view taken substantially along the lines 19—19 of FIGURE 18; and FIGURE 20 is a fragmentary perspective view of the weighted plates.

Figure 11:
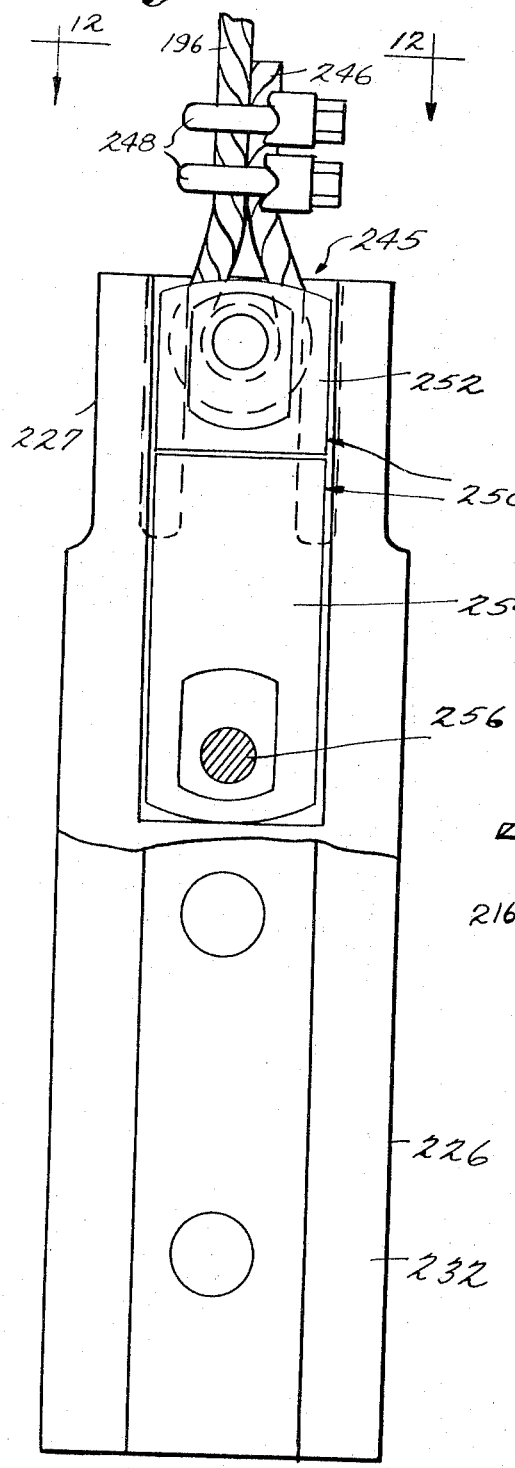
FIGURE 11 is a side elevational view of the coupling pin.

FIGURE 1 shows one form of the earth auger, namely, a small earth auger 20 incorporating the principles of the invention. The small earth auger comprises a frame means 22 having a drive shaft 24 mounted at least partially within the confines of the frame means. The frame means is shown preferably comprising at least a first side 26 and an oppositely disposed second side 28. The opposite sides are connected, as by welding, at their lower end with a first plate 30 and at their upper end with a handle means 32, preferably made of aluminum tubing. A second plate 34 is positioned horizontally between the two side members intermediate the handle means 32 and the first plate 30. The frame means, in the preferred embodiment of the invention, is made of high strength aluminum plate except for the first side 26 which is preferably made of steel with an aluminum finish for a purpose which will become apparent hereinafter.

The drive shaft is journaled at its upper end in a bearing member, not shown, attached to the lower surface 33 of the second plate 34. The drive shaft has a first collar means 36 secured thereto as by set screws 38 and is positioned adjacent to and above the first plate 30. A flanged bearing housing 40 is attached to the drive shaft 24, as by set screws 42, and is positioned adjacent to the lower side of first plate 30. The flanged housing 40 houses a ball bearing thrust bearing, not shown, which allows the drive shaft to pass through it. Preferably, a washer means 44 is interposed between the flange bearing housing 40 and the lower surface of the first plate 30. The drive shaft is operatively secured at its lower end 46 to auger means 48, such as a light duty-type flight auger having flights 49 with, for instance, a two to six inch diameter. The auger means may be attached to the drive shaft by any common mechanical attachment means such as by set screws 50.

A first beveled gear 52 is rigidly secured to the drive shaft intermediate first plate 30 and second plate 34. The first beveled gear 52 meshes with a second beveled gear 54 rotatably disposed on an axis at right angles to the axis of the first beveled gear. The second beveled gear 54 is secured to a gear drive shaft 56 which extends through the second side 28 of the frame means and is journaled for rotation in a lower flange bearing 58 secured to the outer surface of the second side 28 of the frame. A gear drive shaft collar member 60 is secured on the gear drive shaft 56 adjacent to the outside surface of the second side 28 of the frame means to prevent inward axial movement of the gear drive shaft and thus maintain the gear drive shaft and the second beveled gear in an operative position with respect to the first beveled gear.

An upper flange bearing 62 is secured to the outer surface of the second side 28 frame means above the lower flange bearing 58. A crank shaft 64 is positioned through the second frame side 28 and the upper flange bearing 62 and is prevented from axial movement inwardly by a crank shaft collar member 66 secured on the crank shaft adjacent to the outer surface of the second frame side 28. A crank arm 68 is secured at one end to the outer end 70 of the crank shaft, as by set screws 72. A crank handle 74 is secured to the other end of the crank arm 68 by which the crank arm and crank shaft can be rotated by hand.

As seen more clearly in FIGURE 2, the inner end 76 of the crank shaft is rigidly secured to a drive gear 78 having a hub 80 for enabling the drive gear to be attached to the drive shaft. The hub 80 is adjacent to the inner side of the second frame side 28 and thereby prevents outward axial movement of the crank shaft 64. A driven gear 82 having a hub 84 formed integrally therewith is secured to the gear drive shaft 56 adjacent to the second frame side 28 intermediate the second frame side and the second beveled gear 54. The driven gear and hub, as above, prevent outward axial movement of the gear drive shaft so as to position the second beveled gear 54 in an operative meshing relationship with the first beveled gear 52. In summary, the driving means is supported by the frame means 22 and preferably comprises a single manual drive including a driven gear 82 meshing with a drive gear 78 such that rotation of the crank shaft and drive gear imparts a rotational movement to the driven gear 82 and second beveled gear 54. The rotation of the second beveled gear in turn drives the first beveled gear and the drive shaft 24. The auger means being operatively connected to the drive shaft is rotatably driven thereby and drills a hole corresponding to the diameter of the flights of the auger means.

As shown in FIGURE 1, a plurality of weight means 86 are operatively connected with the auger means 48 for increasing the bite thereof during rotation within the earth. The weight means 86 are preferably removable so that the additional weight may be increased or decreased according to the consistency of the soil. The weight means 86 is shown supported by the frame means and positioned in two places along the inner side of the first frame plate 26. The upper weight means are supported on the second plate 34 while the lower weight means are supported on an angle clip 88 rigidly secured, as by welding, to the inner side of the first frame plate 26 intermediate the first plate 30 and the second plate 34.

The weight means comprise a plurality of weighted plate members 90 having an indentation 92 along their lower edges 94 for enabling the plate members to be positioned on rod members 96 secured on the upper side of the second plate 34 and on the upper side of the angle clip 88. The rod members 96 prevent transverse movement in a plane parallel to the first frame side. However, it is desirable to also include a plurality of magnets 98 secured in the weighted plates 90 for preventing movement in a plane perpendicular to the first frame side. In order to accomplish the object of holding the plates in place the magnets must be aligned so as to attract the magnet of the adjacent plate. Accordingly, the north and south poles of the magnets must be positioned so as to attract each other. In the preferable form of the invention the various poles of the magnets may be colored so as to enable the operator to align the plates quickly and properly. The preferred design of the plates, as set forth above, is such that the plates can be easily and quickly applied or removed. It is apparent, also, that in order to hold the weighted plate members in place, the first frame side should be made out of some metal to which magnets will be attracted. Furthermore, it may be desirable to provide a weighted plate member 100 without magnets for use in the innermost position, as shown in FIGURE 3, with respect to the upper group of plates, since magnets would not be required in this position.

It is also within the scope of this invention to include balancing means supported by the frame means in a position substantially within the confines of the frame means for aligning the center of gravity of the earth auger as closely as possible to the axis of the auger means thus enabling the auger means to be balanced more easily. It will be noted that the weight means 86 is positioned contiguously to the first frame side 26. Accordingly, by so positioning the weight means, the weight of the drive mechanism positioned adjacent to the second frame side 28 is offset and the center of gravity of the earth auger 20 is aligned as closely as possible to the axis of the auger means 48.

The earth auger also includes removal means 101, supported by the frame means, for aiding the removal of the auger means from the earth. As illustrated, this means 101 comprises a pair of handles 102 which are pivotally attached to the flange bearing, not shown, positioned around the drive shaft 24 and connected to the lower side of second plate 34. The handles 102 are attached adjacent to and on opposed sides of the drive shaft and are movable between a first position substantially parallel to the drive shaft 24 and a second position substantially perpendicular to the drive shaft as shown in FIGURE 1. When the handles assume this second position, they can be used to lift the earth auger from a hole once it has been drilled in the earth.

It is additionally within the scope of this invention to include leveling means 104 for enabling the auger means to be positioned vertically. As shown in FIGURE 1, the level will establish vertical positioning of the auger in a plane parallel to the frame sides 26 and 28. It will be appreciated, however, that it is within the scope of the invention to include different types of leveling means so that the small auger may be positioned vertically in all planes.

It is also within the scope of the invention to include an extension shaft for the small auger which could be attached to the lower end 46 of the drive shaft at one end, and at the other end the extension shaft would be designed to be rigidly secured to the auger means. While the extension shaft would allow holes of maximum depth to be drilled, the maximum depth would also be determined by the auger flight diameter, consistency of the soil, the additional weight which is added to the auger in the form of plates, and the physical strength of the operator. With the small auger it is only contemplated that weights totaling, for example, a maximum of 30–40 pounds, would be added, for the small auger is intended to be used generally for drilling relatively shallow and frequent holes. The weights may be varied depending on the circumstances and, if, for instance, it is desirable to have an auger of reduced weight for drilling a multitude of shallow holes, the drive gear 78 and driven gear 82, with the accompanying mechanisms associated therewith, may be eliminated and the crank arm and handle secured directly to the gear drive shaft 56 so as to drive the beveled gears 52 and 54 directly.

It can also be seen by positioning the drive shaft off-center and more adjacent to the first frame side 26 of the auger, the earth auger may be placed contiguously with an existing structure, such as a fence post, so that a hole of small diameter may be drilled against this existing structure. As such, the axis of the drive shaft could be positioned approximately two inches from the outer surface of the first frame side 26, and an auger flight having a radius of two inches could then be used to drill a hole of approximately four inches flush against an existing structure. By positioning the drive mechanism adjacent to the second frame side 28, the earth auger may be placed flush with an existing structure without interfering with the drive mechanism due to the fact that there is no external mechanism outside the first side 26.

While the small earth auger is satisfactory for drilling relatively shallow holes, it may be necessary to employ a somewhat larger auger for drilling deeper and larger holes for objects such as telephone poles. Consequently, it is within the scope of my invention to include the principles heretofore set forth in another embodiment of the invention which discloses a large earth auger 110, as shown in FIGURE 3. The large auger 110 compri a frame means 112 preferably having four slide rails 1 received in lower slide rail terminals 116 which in tu are mounted on a base plate deck 118. The base pl deck is supported by a plurality of wheels 120 mount for rotation by axles 121 extending through angle me bers 122 depending downwardly from the lower surfa of the base plate deck 118, as is also shown in FIGURE It is also within the scope of the invention to inclu means for leveling the earth auger once it is in positi for drilling, such as a plurality of leveling screws 1 adjacent to each wheel 120. The leveling screws a threadedly supported in support brackets 126 which a welded to the edge of the base plate deck 118. A ba plate 128 is provided for each leveling screw so as provide a ground-surface engaging means for the leveli screws. A removable hand wheel 130 is additional provided for rotating the leveling screw and thereby lev ing the base deck 118 and hence the entire earth aug regardless of the contour of the ground on which t large earth auger stands. To determine the extent which the leveling screws should be adjusted, a bubb level could be placed on the top plate deck. Such bubble level might even be permanently attached to t earth auger. It should also be appreciated that the ba plate 128 could be removed if the auger were position on a level stretch of ground. In this instance, the leve ing screws, which have a somewhat pointed tip 13 could be screwed into the ground to provide good ancho age and stability. It can be appreciated that in mo cases only one or two base plates 128 need be used the leveling process, at which times the remaining leve ing screws 124 may be screwed into the ground to pr vide anchorage and better stability.

The slide rails 114 are received in upper slide ra terminals 134 which in turn are secured to the lower su face of the top plate deck 136.

A driving head means 138, positioned substantiall within the confines of the frame means 112, is slidabl carried by the slide rails 114 and operatively supports drive shaft 140 at least partially within the confines the frame means. More particularly, the driving hea means 138 comprises a plurality of guide sleeves 142 slic ably mounted on the slide rails 114. As seen in detail i FIGURE 5, an upper plate deck 144 having a pluralit of holes, not shown, for receiving the slide rails 114 secured, as by bolts 148, to the upper end of the guid sleeves 142. A lower plate deck 150 having holes 152, illustrated in FIGURE 7, for receiving the slide rail i correspondingly attached, as by bolts 154, to the lowe end of the guide sleeves. A pair of plate members 15 is supported on opposite sides of the frame member b the upper and lower plate decks and positioned intermedi ate the slide rails. As shown more particularly in FIG URE 6, the plate members 156 preferably comprise ] beams which can be easily bolted, as shown at 158, t the upper and lower decks.

The I-beam has a flange bearing 160 centrally locate therein and extending through the I-beam for receivin a gear drive shaft 162. As shown in FIGURE 3 an FIGURE 7, the drive means preferably comprises a dua driving mechanism including a gear drive shaft 162 havin a crank arm 164 secured at its outer end with a handl 166 secured to the free end 168 of the crank arm. Eacl gear drive shaft 162 extending through the flange bearin 160, located in the pair of opposite I-beam plate mem bers 156, has a beveled gear 172 secured as by set screw 174 to the inner end of the drive gear shaft. Colla means 170 are also positioned on the gear drive shaft o opposite sides of the flange bearing 160 so as to maintair the axial position of the gear drive shaft. The belevec gear 172 meshes with a beveled drive gear 176 havin a hub 178 which is attached, as by set screws, to th drive shaft 140 adjacent to the lower plate deck 150. A washer 180 is preferably interposed between the hub 17 the lower plate deck 150. The upper end of the
shaft is received within a flange bushing 182 se-
d to the lower side of the upper plate deck 144. Ro-
n of the crank arm and gear drive shaft drive the
ing beveled gears which in turn impart a rotational
ement to the drive shaft having an auger means 184
atively connected thereto.

'eight means 186 is supported on the upper surface
of the upper plate deck 144 for increasing the bite
e auger means 184 during rotation within the earth.
hown more particularly in FIGURE 8, which is a
mentary plan view of the upper plate deck 144, the
ht means is preferably removable and comprises
hted plates 190 having handles 192 thereon so that
can be easily handled. The plates have a recess 194
h allows the plates to be slipped around a cable
ns 196 extending vertically through the horizontal
hted plates. In the preferred form of the invention,
weighted plates have a plurality of magnets 198 se-
d therein for enabling the plates to be attracted to
other. Accordingly, the plates should be placed on
upper plate deck so that the north pole of the mag-
in one plate is contiguous with the south pole of the
nets in the adjacent plate. The magnets are prefer-
colored so that the poles can be easily recognized.
he magnets along with plate supporting means 200
l the plates in place during the drilling operation. The
e supporting means 200 preferably comprises a pair
ocking bars 202 and stop means 204 for each plate.
locking bars 202 are welded to the upper plate deck
hown more particularly in FIGURES 3 and 17 and
ide a side guide for the weighted plates. As shown
e particularly in FIGURE 20 the stop means 204 is
red to each plate and depends from one surface 205
ach plate in a relation such that it may be operatively
ived by the plate adjacent to the depending stop
ns for enabling the plurality of weighted plates 190
e easily nested.

s illustrated in FIGURE 20, the stop means 204 pref-
ly comprises at least two corner stops 207 which are
red, as by spot welding, to the upper half of at least
corner edges of each weighted plate and project or
end from the surface 205 in such a manner that when
weighted plates are stacked one above the other, the
jection of the corner stop above the top surface of
plate will engage the bottom half of the corner edge
he next plate above. Thus, by the process of nesting
the corner stops and supplying each plate with mag-
s, the plates are operatively connected. As shown in
URE 14, an intermediate weighted plate 206, having
same configuration as the weighted plates 190 but not
ing any magnets, is secured to the upper plate deck,
by tack welding, and has corner stops secured thereto
manner similar to the positioning of corner stops 207
the weighted plates 190. Thus, in operation, it will
seen that the weighted plates are operatively secured
the upper plate deck 144 of the driving head means
and hence through the driving head means to the
er means 184 in order to give the auger means a
ater bite during rotation within the earth.

t will be appreciated that the stop means could com-
e projections depending from the surface of the
ghted plates or any other type of keying means which
ld, in fact, include the plates being configured so that
y would nest naturally. It is also possible to provide
arge stop means secured to the upper plate deck and
ending upwardly into a position wherein the weighted
tes would abut the stop means. A stop means which
ermanently secured to the upper plate deck is less de-
ble than the preferred arrangement in which, it will
noted, all the weighted plates, with the exception of the
ermediate plate 206, may be entirely removed when
ired thus allowing the driving head means 138 to rise
additional height equal approximately to the height of
plate stack. Consequently, this extra distance, which would be approximately represented by the height of the
stop means permanently secured to the upper plate deck
or by the height of the removed plates, would add a cor-
responding distance either to the depth to which the hole
may be drilled (by allowing use of a longer auger) or to
the space used for accessibility for connecting or removing
an extension shaft means as will be described hereinafter.

It is also within the scope of this invention to include
balancing means operatively supported by the frame
means in a position substantially within the confines of
the frame means for aligning the center of gravity of the
driving head means as closely as possible to the axis of
the auger means thus enabling the driving head means
to slide on the rails 114 without any tendency to bind. As
such, the weighted plates can be positioned so as to pro-
vide this desirable balancing effect.

Figure 9:
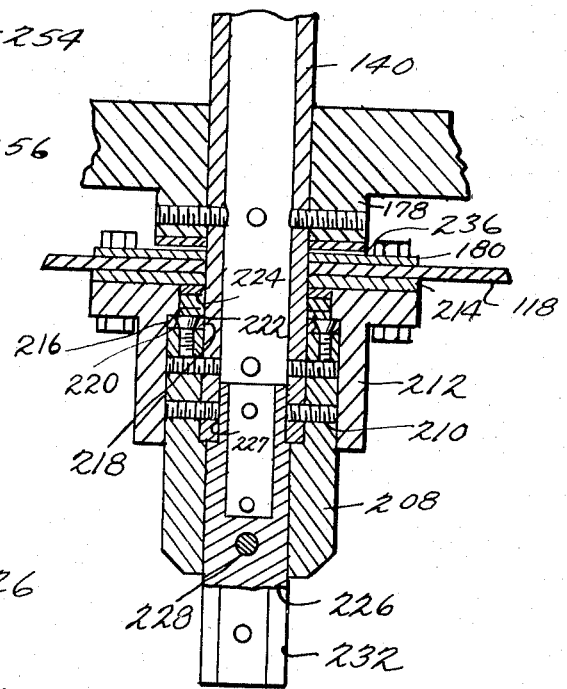
FIGURE 9 is a fragmentary sectional view showing the connection between the drive shaft and the coupling pin.

The operative connection by which the auger means
184 is attached to the drive shaft 140 is shown in detail
in FIGURE 9. It will be appreciated, however, that
although one form of connection is shown in this figure,
any other common mechanical connection could be em-
ployed so long as it fulfills the objects of the invention
set forth herein. More specifically, FIGURE 9 shows
the lower end of drive shaft 140 connected directly to a
driving hub 208, as by set screws 210. The driving
hub 208 is rotatably received in a flanged driving hub
housing 212 which is rigidly secured to the lower plate
deck 118, as by bolt means or any other common con-
nector means. As illustrated, a washer 214 is interposed
between the flange driving hub housing 212 and the lower
plate deck 118. Furthermore, the preferred embodiment
includes a thrust washer 216 secured to the top surface
218 of the driving hub 208. The thrust washer 216 en-
gages an abutment 220 formed by the flanged driving hub
and is also engaged by a ball thrust bearing 222 posi-
tioned in an annular recess 224 formed by the driving hub
208 and the drive shaft 140.

A coupling pin 226 is partially received within the driv-
ing hub 208 and has its upper end 227 recessed so as to
extend upwardly into the drive shaft 140 which is prefer-
ably hollow. The coupling pin is secured to the driving
hub by pin 228 which is disclosed in detail in FIGURE
10. The pin 228 has a hinged handle 230 so that it can
be removed with ease whenever desired. The lower part
232 of the coupling pin 226, extending beyond the driv-
ing hub, is adapted to be received in a recess 234, as
seen in FIGURE 3, formed in the upper end of the auger
means 184. The auger means and the coupling pin are
secured by a pin similar to pin 228 having a hinged
handle 230 such that the parts can be readily discon-
nected.

It will be noted that the hub 178 of the beveled drive
gear 176 does not engage the washer 180, but rather
a space 236 is maintained between these two parts so that
there will be no frictional engagement during the rotation
of the drive shaft. When the auger is unsupported, the
hub 178 will abut the washer 180 and a space correspond-
ing to space 236 will be formed between the abutment 220
of the flange driving hub housing 212 and the thrust washer
216. However, when the auger means engages the ground
such that it is forced upwardly, the thrust washer 216
will abut the abutment 220 and the ball thrust bearing
222, and accordingly the drive shaft 140 and hub 178
attached thereto will be pushed upwardly to maintain the
space 236.

As shown in FIGURE 3, the auger means comprises
an auger shaft 238 around which a series of auger flights
240 are integrally formed terminating in a boring head
242. The auger means and driving head are supported,
as well as raised and lowered on the slide rails, by winch
means 244, secured to the upper plate deck 136, and cable
means 196, extending through the upper plate deck 136,
the weighted plates 190 by means of recesses 194 and
the hollow drive shaft 140. One end 246 of the cable
means is operatively connected to the auger means 184 and the driving head means 138 so as to enable the winch means to hoist the auger means from the ground.

Figure 12:
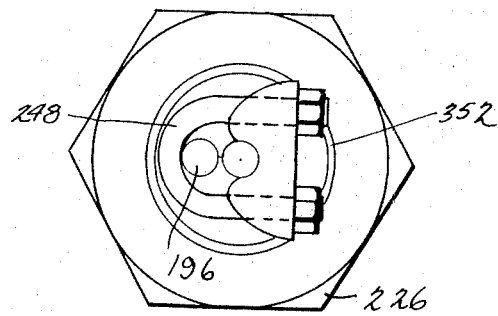
FIGURE 12 is a sectional view taken substantially along the lines 12—12 of FIGURE 11.

More particularly, this operative connection includes means 245 for preventing the cable means from twisting during rotation of the drive shaft and the auger means. In the preferable embodiment of the invention the twist prevention means includes the lower end of the cable means 246 being secured, as by clamps 248, to a swivel 250, as shown in FIGURES 11 and 12. The swivel comprises a top portion 252 and a bottom portion 254 which are axially connected but rotatably independent of each other. The cable means is attached to the top portion 252 of the swivel while the bottom portion of the swivel is positively connected, as by a set pin 256, to the coupling pin 226. By having the top and bottom portions axially connected, the hoisting force of the cable means is imparted to the bottom portion and through the bottom portion and coupling pin to the auger means and the driving head means. However, inasmuch as the top portion and bottom portion are rotatably independent of each other, the top portion will remain substantially stationary during the rotational movement of the bottom portion imparted by the latter's indirect connection to the driving shaft and thereby prevent the cable means from twisting. It is within the scope of this invention to employ any other means for coupling the cable to the auger means and the driving head such that the cable will be able to impart an axial force on these members and yet be prevented from twisting during the rotation of the auger means.

The winch means 244 is positioned on the top plate deck 136 and is shown in detail in FIGURES 3, 13, 14 and 15. More particularly, the winch means includes a winch shaft 258 which is rotatably journaled in support means, such as bearing blocks 259 and 260 positioned on opposite ends of the winch shaft and secured to the top plate deck 136. For greater support an additional bearing block 161 is positioned on the winch shaft intermediate the free ends.

A winch drive means 262 is used to rotatably drive the winch shaft. The winch drive means comprises a driven gear 264 having a hub 266 integrally connected thereto. The driven gear and hub are secured to the winch shaft means 258 by any means, such as set screws 268. The driven gear 264 is rotatably driven by a drive gear 270 having a hub 272 integrally formed therewith. The drive gear and hub are mounted on a winch crank shaft 274 which is supported for rotation by block bearings 276 engaging the winch crank shaft on opposite sides of the drive gear 270 and hub 272. A winch crank arm 278 is secured to the outer end 280 of the winch crank shaft. The winch crank arm 278 has a handle 282 secured to its free end which can be grasped for easy rotation of the winch drive means 262.

A drum stop rachet gear 284 having a hub 286 is secured, as by set screws, to the winch shaft 258 adjacent to the bearing block 260 at the opposite end from that on which the driven gear 264 is secured. A pawl means 288 is secured to the top plate deck 136 by a support bracket 290 and is positioned so as to engage the drum stop ratchet gear. As shown, the pawl is engaged by gravity and released by hand, although it will be appreciated that any type of pawl and ratchet mechanism may be utilized within the scope of this invention. A pair of collar members 292 is secured to the opposite ends of the winch shaft means so as to prevent axial movement of the shaft.

A hoisting drum means 294 is positioned on the shaft intermediate its two ends. The other end 296 of the cable means 196 is rigidly secured to the hoisting drum means as shown at 298. The cable means is wound and unwound on the hoisting drum means and extends through the opening 300 in the top plate deck to be eventually secured to the swivel means 250 as heretofore described.

The winch shaft means 258 has an annular cross section except for an intermediate portion 302 which has a transverse cross section with at least a portion of the outer surface 305 being substantially flat. In the preferred embodiment the transverse cross section is square. As shown more particularly in FIGURE 16, the drum means 294 is split into two parts 301 which are held together by securing means 303. When assembled the drum means 294 has an annular outer surface 304 on which the cable means is wound and a square opening 306 extending axially therethrough for receiving the correspondingly square intermediate portion 302 of the winch shaft. It will be appreciated that while the intermediate portion has been described as having one surface 305 substantially flat and shown in the drawings as being square, it is within the scope of this invention to use any type of means for securing the drum means to the winch shaft such that the drum means is both axially slidable along the winch shaft and rotatably driven by the winch shaft. Such means could, within the scope of the invention, include any type of keying means. By being axially slidable during its rotational movement, the drum means can be positioned so that the cable means being wound or unwound thereon will be maintained substantially coaxially with the hollow drive shaft 140. It will be seen that during the winding operation the unwound cable engaging the cable already wound on the drum means will cam the drum means axially along the winch shaft thereby remaining substantially aligned with the axis of the drive shaft 140. During the unwinding of the cable the drum means will be pulled into alignment so that the cable means will remain substantially coaxially with the drive shaft means.

As seen more particularly in FIGURE 7, it is also within the scope of the invention to provide a means 308 to remove dirt from the auger after the auger has been withdrawn from the hole. One embodiment of this means is disclosed in the application and comprises a spinning gear 310 mounted on a spinning gear shaft 312 which is journaled for rotation within a flange bearing 314. The flange bearing is supported by a channel beam 316 extending between the upper and lower plate decks 144 and 150 similar to the support structure for the gear drive shaft 162. The outer end 318 of the spinning gear shaft 312 has a spinning crank arm 320 secured thereto with a handle means 322 secured to the free end 324 of the spinning crank arm 320. The spinning gear 310 meshes with a second beveled surface 326 positioned in a recess 328 in the beveled drive gear 176, as seen more clearly in FIGURE 3. The spinning gear 310 is positioned radially inwardly as compared to the beveled gears 172 and meshes with the second beveled surface 326 in a ratio, such as 1:1, which will enable rapid rotation of the auger means to be developed. This rapid rotation of the auger means causes the dirt to spin out of its caught position between the flights 240 of the auger means 184.

It is within the scope of the invention to provide a common type of clutch means for use with the spinning gear 310 so as to enable it to be disengaged when not in use. Likewise, such a clutch means may also be employed with all the gear means having external crank means so as to prevent rotation of the associated crank shaft, crank arms, and handles when desired.

The earth auger as disclosed herein also includes in its preferable embodiment a dirt flange barrier 330 received within an opening 332 in the base plate deck 118 and removably connected thereto as shown more particularly in FIGURES 3 and 4. The dirt flange barrier is preferably split in two parts 334 and 336 so that it can be removed while the auger is positioned in the hole in a situation where access is desired to that part of the shaft or auger enclosed by the dirt barrier.

The earth auger as described could weigh approximately 600 pounds, although careful design and the use of lightweight materials could lower this weight somewhat. In view of the fact that the weight is relatively heavy and the center of gravity relatively high, it would probably be too much of a risk for an operator to try to roll the earth auger on two wheels in a "hand-truck fashion"; consequently, as heretofore described, four wheels are provided so that the earth auger may be rolled along the ground. Furthermore, a weight of approximately 600 pounds is too great for the earth auger to be manually lifted on and off a truck conveniently. Consequently, means 338, such as a plurality of lifting eyes, secured to the top plate deck 136, have been provided for engaging slings used with a truck hoisting device. The lifting eyes 338 could be eliminated, however, if a truck had a hydraulic-operated tail gate on which the earth auger could be lifted on and off a truck.

In view of the weight of the large earth auger and in view of the fact that the driving head means 138 might weigh as much as 225 pounds, it will be appreciated that in some instances it will not be necessary to add the weighted plates in order to drill holes conveniently. The weighted plates for the large machine might weigh approximately 30 pounds each such that a maximum use of about ten plates would increase the weight of the driving head by 300 pounds. It will be appreciated that the weight of the plates and the actual number of plates which can be used will be determined by the size of the plates and the material used as well as the space limitations created by the actual structural design of the earth auger.

The large earth auger has a capability of boring holes of six to twelve inches in diameter and of varying depths up to eight feet or more. It will be appreciated that the maximum hole depth possible will be influenced by the auger length, the auger flight diameter, and the consistency of the soil in which the holes are to be bored, plus the physical strength of the operator.

In operation, once the drilling or boring of a particular section of a hole has been completed, the driving head means 138 is hoisted up by the winch means 244 with the cable means 196 being wound around the hoisting drum means 294. In order to hold the driving head assembly in a raised locked position, locking means 340 are provided for holding the driving head means 138 adjacent to top plate deck 136. As shown more specifically in FIGURE 17, the locking means comprise the locking bars 202 which additionally function to hold the weighted plates 190 in place. The locking bars 202 have a plurality of holes 342 extending therethrough into which key means 344 is inserted so as to lie on the top surface 345 of the top plate deck 136 and thereby support the driving head means 138 which is operatively connected to the locking bars 202.

In order to deepen the hole beyond the depth corresponding to the length of the auger means, it is necesary to provide an extension means 346, as shown in FIGURES 18 and 19, having means 348 for enabling the extension shaft to be placed intermediate the drive shaft 140 and the auger means 134 and coaxially with the cable means without removing the cable means from the winch means and the auger means. The extension means comprises a hollow shaft 350 such that the cable means can extend coaxially therethrough. The hollow shaft at one end 352 is adapted to receive the upper end of the recessed upper end 227 of the coupling pin 226, and at the other end 354 the extension shaft is recessed so as to be received within the driving hub 208. The longitudinal slot 356 allows the hollow shaft 350 to be placed coaxially with the cable means without removing the cable means from either the winch means or the auger means.

It can be seen, therefore, in operation that when the driving head means is locked in position, the pin means 228 is removed by its hinged handle 230 so as to disconnect the coupling pin from the driving hub. Throughout this latter operation, the pawl means 288 has been positioned to engage the drum stop ratchet gear 284 and thus hold the auger means when the motion of the winch shaft stops. As long as the auger means is connected to the driving hub, the pawl 288 will additionally support the driving head means along with the locking bars 202. In order to remove the pin 228 easily the winch crank means is used to maintain tension on the cable means until the pin 228 is removed. The pawl 288 is then disengaged, and thereafter the auger means, with the coupling pin secured thereto, is lowered by the winch means into the previously drilled hole. The depth of the previously drilled hole should be such that the coupling pin is accessible above the level of the base plate deck 118. If, for some reason, the coupling pin extends below the base plate deck, the dirt flange barriers 330 can be removed, as heretofore described, in order to give access to the coupling pin. The slotted extension shaft 350 is slipped over the hoisting cable 196 with the lower end 352 seated on the upper end 227 of the coupling pin. A pin similar to pin 228 is inserted through an opening 358 in the extension shaft so as to couple the extension shaft with the coupling pin. The winch means is then used to raise the upper end 354 of the extension shaft into the recess formed in the driving hub 208. Pin 228 is thereafter inserted into the driving hub to operatively connect the driving hub with the extension shaft. A further increase in tension on the hoisting cable will raise the driving head means sufficiently to disengage the key means 344 so that the complete assembly of driving head means, auger means, and extension shaft is lowered until the auger means again hits the bottom of the previously drilled hole. The earth auger is now in position to increase the depth of the hole by the length of the extension shaft. It will be appreciated that the previous operations may be repeated to add further extension shafts thereby deepening the hole to the desired depth.

While the large earth auger has been described as a manually driven auger, preferably comprising a duplex manual drive system so as to balance the torque applied by the drive means, it will be appreciated that an integral electric drive system could be incorporated into the invention. Such a drive mechanism could have a variety of speeds, the use of which would be determined by soil conditions. Additionally, it will be seen that the greatest speed could be used in lieu of the spinning gear such that the dirt would be spun out of the flights of the auger by rapid rotation thereof.

While a somewhat detailed description of the mechanical and structural elements of both the small and large earth augers has been given, it will be appreciated that other common mechanical equivalents, well known in the art, could be substituted for the mechanical and structural elements described in detail herein. Therefore, the foregoing description should be viewed merely as a preferred form of the invention, and it should be adequately clear that considerable modification may be made thereto without departing from the principles of the invention. Consequently, the foregoing should be considered in an illustrative sense rather than a limiting sense, and accordingly the extent of this invention should be limited only by the spirit and scope of the claims appended hereto.

What is claimed is:
1. An earth auger comprising:
 a drive shaft;
 hand-balanced frame means mounted solely on one end portion of said drive shaft, said drive shaft being rotatably journalled in said frame means and axially keyed to prevent relative axial movement with respect to said frame means;
 auger means secured to the other end of said drive shaft and rotatably driven by said drive shaft;
 driving means supported by said frame means and operatively connected with said drive shaft for imparting a rotatable movement to said drive shaft so as to rotate said auger means; and
 removable weight means operatively connected with said auger means for increasing the bite thereof during rotation within the earth, said weight means be- ing supported by said frame means in a position substantially within said confines of said frame means for aligning the center of gravity of said earth auger as closely as possible to the axis of said auger means thus enabling the earth auger to be balanced more easily.

2. The earth auger defined in claim 1 additionally comprising means for aiding the removal of said auger removal means from the earth, said removal means being supported by said frame means.

3. The earth auger defined in claim 2 wherein said removal means comprises a pair of handles pivotally attached to said frame means adjacent to and on opposed sides of said drive shaft, said handles being movable between a first position substantially parallel to said drive shaft and a second position substantially perpendicular to said drive shaft, said handles in said second position enabling said earth auger to be lifted easily from the drilled hole in said earth.

4. The earth auger defined in claim 1 wherein said removable weight means comprises a plurality of plates having magnets secured therein to aid in holding said plates in place, said magnets being aligned so as to attract said magnet of the adjacent plate.

5. The earth auger defined in claim 1 additionally comprising leveling means for enabling said auger to be positioned vertically.

6. An earth auger comprising:
a drive shaft;
hand-balanced frame means mounted solely on one end portion of said drive shaft, said drive shaft being rotatably journalled in said frame means and axially keyed to prevent relative axial movement with respect to said frame means, said frame means having at least a first side and a second side with said drive shaft positioned closely adjacent to said first side of said frame means;
auger means operatively secured to the other end of said drive shaft and rotatably driven by said drive shaft;
driving means supported on said frame means and operatively connected with said drive shaft for imparting a rotatable movement to said drive shaft so as to rotate said auger means, said driving means being closely adjacent to said second side of said frame means so as to enable said first side of said frame means to be positioned contiguously with an existing structure and so as to enable a hole of small diameter to be drilled adjacent to said existing structure; and
removable weight means operatively connected with said auger means to increase the bite thereof during the rotation within the earth, said removable weight means being supported by said frame means and being positioned contiguously to said first side of said frame means so that the center of gravity of said earth auger will be aligned as closely as possible to the axis of said auger means thus enabling said earth auger to be balanced more easily.

7. An earth auger comprising:
a frame having at least opposed first and second sides;
a drive shaft rotatably supported by said frame closely adjacent to said first side of said frame;
an auger secured to one end of said drive shaft and rotatably driven by said drive shaft;
a driving means partially supported by said second frame side and operatively connected with said drive shaft for imparting a rotational movement to said drive shaft so as to rotate said auger, said driving means being closely adjacent to said second side of said frame means so as to enable said first side of said frame means to be positioned contiguously with an existing structure;
a pair of handles pivotally attached to said frame adjacent to and on opposed sides of said drive shaft, said handles being movable between a first position substantially parallel to said drive shaft and a second position substantially perpendicular to said drive shaft, said handles in said second position enabling said earth auger to be lifted easily from the drilled hole in the earth;
a leveling means mounted on said frame for enabling said auger to be positioned vertically; and
removable weighted plates operatively connected with said auger for increasing the bite thereof during rotation within the earth, said plates being supported by said first side of said frame so as to offset the weight of said drive means and allow the center of gravity of the earth auger to be more closely aligned with the auger axis thereby enabling the earth auger to be balanced more easily, said plates having magnets secured therein to aid in holding said plates in place, said magnets being aligned so as to attract the magnet of the adjacent plate.

8. An earth auger device comprising:
frame means;
drive head means slidably mounted on said frame means so as to be positioned substantially within the confines of said frame means;
a drive shaft mounted at least partially within said drive head means and extending coaxially with said drive head means in the axis of its slidable movement;
auger means operatively secured to one end of said drive shaft and rotatably driven by said drive shaft;
driving means supported by said drive head means and operatively connected with said drive shaft to impart a rotatable movement to said drive shaft so as to rotate said auger means;
means supported by said frame and operatively connected to said auger means for hoisting said auger means from the hole once it is drilled, said hoisting means comprising winch means secured to said frame means above said shaft, cable means having one end connected to said winch means and the other end operatively connected with said auger means, said shaft being hollow and said cable means extending coaxially therethrough, and means for preventing said cable means from twisting during said rotation of said drive shaft and said auger means; and
means associated with said said frame means to hold said drive head means adjacent to the top portion of said frame means when said auger means is not being used.

9. The earth auger defined in claim 8 additionally comprising means to remove dirt from said auger means after said auger means is withdrawn from said hole, said dirt removing means comprising a supplemental hand-driven means operatively connected with said drive shaft in a lower ratio than that by which said drive means is connected with said drive shaft for rotating said drive shaft and said auger means at a higher speed than rotated by said drive means so as to spin said dirt out of said auger means.

10. The earth auger as defined in claim 8 additionally comprising removable weight means supported on said drive head means and operatively connected with said auger means for increasing the bite thereof during rotation within the earth.

11. The earth auger as defined in claim 10 wherein said removable weight means comprises a plurality of plates having magnets secured therein to aid in holding said plates in place, said magnets being aligned so as to attract said magnet of the adjacent plate, said plates having stop means secured to said plates and depending from the surface of said plate, said stop means being operatively received by the plate adjacent to said depending stop means for enabling said plurality of plates to be easily nested.

12. The earth auger defined in claim 8 additionally comprising wheels supported on the lower end of said frame means for enabling said earth auger to be moved across the ground and means for leveling said earth auger once said earth auger is in position for drilling.

13. The earth auger defined in claim 8 wherein said means for preventing said cable means from twisting comprises a coupling pin connected to said drive shaft and to said auger means so as to impart said rotational movement of said drive shaft to said auger means, and a swivel means having a top portion and a bottom portion axially connected but rotatably independent of each other, said bottom portion being positively connected to said coupling pin and said upper portion being connected to said cable means, said top and bottom portions being axially connected so that the hoisting force of said cable means is imparted to said bottom portion but said cable means and said top portion remain substantially stationary during the rotational movement of said bottom portion so as to prevent said cable from twisting.

14. The earth auger defined in claim 8 additionally comprising a hollow extension shaft for increasing the depth to which said auger means can dig, said extension shaft having opposed free ends, one end having means to secure said extension shaft to said drive shaft and the other end having means to secure said extension shaft to said auger means, said extension shaft having a longitudinal slot means extending between said free ends for allowing said hollow extension shaft to be placed intermediate said drive shaft and said auger means and co-axially with said cable means without removing said cable means from said winch means and said auger means.

15. The earth auger defined in claim 8 wherein said winch means comprises winch shaft means, winch shaft supporting means having said winch shaft means rotatably journalled therein and being supported by said frame means, winch drive means operatively connected to said winch shaft means for rotating said winch shaft means, and drum means positioned on said winch shaft means and rotatably driven thereby, said drum means having said one end of said cable means attached thereto, and said drum means being axially slidable along said winch shaft means while being rotated so as to maintain said cable means substantially coaxially with said drive shaft means during the winding and unwinding of said cable means on said drum means.

16. The earth auger defined in claim 15 wherein said winch shaft means intermediate said winch shaft supporting means has a shaft means of approximately square transverse cross sectional configuration and wherein said drum means is adapted to fit slidably and axially thereon so as to be able to move axially while being rotatably driven.

17. An earth auger comprising:
  frame means;
  a drive shaft positioned substantially within the confines of said frame means;
  auger means operatively secured to one end of said drive shaft and rotatably driven by said drive shaft;
  driving means mounted on said frame means and operatively connected with said drive shaft for imparting a rotational movement to said drive shaft so as to rotate said auger means; and
  balancing means supported by said frame means in a position substantially within said confines of said frame means for aligning the center of gravity of said earth auger as closely as possible to the axis of said auger means thus enabling said earth auger to be balanced more easily.

18. In an earth auger of the type having frame means, a drive shaft positioned at least partially within the confines of said frame means, an auger means operatively connected with said drive shaft, cable means operatively connected at one end with said auger means and extending coaxially with said drive shaft, the improvement comprising:
  winch means for engaging the other end of said cable means, said winch means including winch shaft means, winch shaft supporting means having said winch shaft means rotatably journalled therein and being supported by said frame means, winch drive means operatively connected to said winch shaft means for rotating said winch shaft means, and drum means positioned on said winch shaft means and rotatably driven by said winch shaft means, said drum means having said other end of said cable means attached thereto, and said drum means being axially slidable along said winch shaft means while being rotated so as to maintain said cable means substantially coaxially with said drive shaft during the winding and unwinding of said cable means on said drum means.

19. In an earth auger of the type having frame means, a drive shaft positioned at least partially within the confines of said frame means, said drive shaft being hollow, an auger means operatively connected with said drive shaft, drive means operatively connected to said drive shaft for imparting rotation thereto, winch means for hoisting said auger means from the hole once it is drilled, cable means extending coaxially through said drive shaft and being operatively connected at one end to said auger means and at the other end to said winch means, the improvement comprising:
  extension means for increasing the depth to which said auger means can dig, said extension means being positioned coaxially with said cable means intermediate said drive shaft and said auger means without removing said cable means from said winch means and said auger means.

20. The improvement defined in claim 19 wherein said extension means comprises a hollow extension shaft having opposed free ends, said extension shaft having a longitudinal slot means extending between said free ends for allowing said hollow extension shaft to be placed intermediate said drive shaft and said auger means and coaxially with said cable means without removing said cable means from said drive shaft and said auger means.

21. An extension shaft for mounting coaxially with a cable without disengaging the engaged ends of said cable comprising:
  a shaft means having opposed free ends, said shaft means having a hollow opening extending axially therethrough and having a longitudinal slot extending between said free ends for allowing said hollow shaft means to be positioned on said cable without disengaging the ends of said cable.

22. In an earth auger of the type having an auger means for drilling a hole in the earth and drive means for rotatably driving the auger means, the improvement comprising:
  means operatively connected to said auger means for removing dirt from said auger means after said auger means is withdrawn from said hole, said dirt removing means comprising a supplemental hand-driven means operatively connected with said auger means in a lower ratio than that by which said drive means is connected with said auger means for rotating said drive shaft and said auger means at a higher speed than rotated by said drive means so as to spin said dirt out of said means.

23. In an earth auger of the type having rotatable auger means, the improvement comprising:
  removable weight means to increase the bite of the auger means wherein said removable weight means comprises a plurality of plates having magnets secured therein to aid in holding said plates in place, said magnets being aligned so as to attract said magnet of the adjacent plate.

(References on following page)

References Cited by the Examiner

UNITED STATES PATENTS

| | | | |
|---|---|---|---|
| 696,480 | 4/1902 | Pierce | 173—44 |
| 792,344 | 6/1905 | Olan | 175—162 |
| 810,490 | 1/1906 | Knupp et al. | 242—117 |
| 2,723,835 | 11/1955 | Reese et al. | 173—30 |
| 2,975,848 | 3/1961 | Roberts | 173—163 |
| 3,012,619 | 12/1961 | Farque | 173—147 |
| 3,207,235 | 9/1965 | Demetriades | 173—30 |

FOREIGN PATENTS 1,028,672  5/1953  France.

FRED C. MATTERN, Jr., *Primary Examiner.*

L. P. KESSLER, *Assistant Examiner.*